United States Patent [19]
Sheffer et al.

[11] Patent Number: 5,568,535
[45] Date of Patent: Oct. 22, 1996

[54] ALARM SYSTEM FOR ENCLOSED AREA

[75] Inventors: Eliezer A. Sheffer, San Diego, Calif.; Shiv P. Verma, Cedar Knolls, N.J.

[73] Assignee: TrackMobile, Inc., San Diego, Calif.

[21] Appl. No.: 344,100

[22] Filed: Nov. 23, 1994

Related U.S. Application Data

[63] Continuation-in-part of Ser. No. 74,034, Jun. 7, 1993, abandoned, which is a continuation-in-part of Ser. No. 891,805, Jun. 1, 1992, Pat. No. 5,218,367.

[51] Int. Cl.⁶ .................................................. H04M 11/04
[52] U.S. Cl. .......................... 379/39; 379/41; 379/42; 379/44; 379/47
[58] Field of Search ............................ 379/37–44, 47–51, 379/58, 59, 93, 100; 340/539; 348/13, 14, 17; 375/222

[56] References Cited

U.S. PATENT DOCUMENTS

| | | | |
|---|---|---|---|
| 3,772,596 | 11/1973 | Edwards | 375/222 |
| 4,688,244 | 8/1987 | Hannon et al. | 379/44 |
| 4,716,582 | 12/1987 | Blanchard et al. | 379/50 |
| 4,805,208 | 2/1989 | Schwartz | 379/93 |
| 4,825,457 | 4/1989 | Lebowitz | 379/40 |
| 4,905,271 | 2/1990 | Namekawa | 379/44 |
| 4,918,717 | 4/1990 | Bissonnette et al. | 379/44 |
| 4,977,609 | 12/1990 | McClure | 379/100 |
| 5,134,644 | 7/1992 | Garton et al. | 379/39 |
| 5,140,308 | 8/1992 | Tanaka | 379/44 |
| 5,164,980 | 11/1992 | Bush et al. | 348/17 |

Primary Examiner—Jason Chan
Attorney, Agent, or Firm—Brown, Martin, Haller & McClain

[57] ABSTRACT

An alarm system for protecting premises comprises a fully integrated, alarm detecting cellular phone unit which is linked to various sensors in order to detect the sensor outputs. The cellular alarm unit includes, in addition to cellular phone functions, a formatter or processor for generating an emergency signal on detection of a sensor output, the emergency signal including information on the type of emergency detected. The unit is programmed to establish a cellular connection to a remote monitoring station. The connection is wireless at least from the premises to a local cell site. Once connection is established, the emergency signal is transmitted to the monitoring station via the local cell site.

10 Claims, 9 Drawing Sheets

| ALARM SIGNAL OUTPUT | INPUTS | | | | | SIREN OUTPUT |
|---|---|---|---|---|---|---|
| | ARM | PERIMETER | FIRE | SPACE | HOME | |
| PERIMETER OUTPUT 70 | ON | ON | OFF | OFF | OFF | ON |
| FIRE ALARM OUTPUT 74 | OFF OR ON | OFF | ON | OFF | OFF | ON (+ INTERNAL SIRENS IN DETECTOR) |
| SPACE PROTECTION ALARM OUTPUT 72 | ON | OFF | OFF | ON | OFF | ON |
| PERIMETER OUTPUT HOME 70 | OFF | ON | OFF | OFF | ON | ON |
| PANIC SIGNAL 76 | MINIMUM OF 3 RAPID ACTIVATIONS OVER 2 SECONDS | | | | | OFF |

ALARM SYSTEM FOR ENCLOSED AREA

CROSS-REFERENCES TO RELATED APPLICATIONS

This application is a Continuation-In-Part of application Ser. No. 08/074,034 filed Jun. 7, 1993, now abandoned, which was a Continuation-In-Part of application Ser. No. 07/891,805 filed Jun. 1, 1992, now U.S. Pat. No. 5,218,367.

BACKGROUND OF THE INVENTION

The present invention relates generally to alarm systems for protection of enclosed areas such as buildings and vehicles, and is particularly concerned with an alarm system suitable for use in stationary premises such as homes, educational establishments, and places of business.

Conventional alarm systems for buildings are subject to a number of disadvantages. The majority of these installations are based on communication between the premises and a monitoring central station via existing telephone wires. Typically, a break-in to the premises activates a sensor which in turn triggers a control panel, turning on a data transmitter to transmit the alarm particulars via the telephone lines to a monitoring central station, so that appropriate action may be taken to protect the premises.

In these known installations, the alarm system can readily be rendered useless simply by cutting the telephone lines at the premises, breaking the communication link between the premises and the monitoring central station. Additionally, false alarm rates are high since human error and equipment malfunction are relatively common in any alarm system. Excessive false alarms increase the expense of operating such systems, and may lead to fines or termination of service. Police department response will be slow or non-existent in the case of alarm systems subject to a high rate of false alarms.

SUMMARY OF THE INVENTION

It is an object of the present invention to provide a new and improved alarm system for monitoring of an enclosed area.

According to the present invention, an alarm system is provided which comprises a cellular telephone unit having a transceiver for receiving and transmitting wireless cellular telephone signals to a local cell site of a cellular telephone network, a signal processing unit linked to the transceiver and to at least one sensor for detecting unauthorized entry to the area and producing an alarm condition in response to detection of an unauthorized entry, the signal processing unit being set up to monitor the output from the or each sensor and to transmit an alarm signal to the transceiver on detection of an alarm condition, and the transceiver being programmed to establish a connection to a predetermined central monitoring station via a local cell site on receiving the alarm signal, and to transmit a wireless emergency signal to the local cell site for transmission to the central monitoring station on establishment of the connection.

This arrangement provides cellular telephone and alarm monitoring and signal transmitting functions in a single modular unit. Thus, a unique, alarm detecting cellular phone unit is provided.

This system can be used to monitor any enclosed area, including vehicles as well as stationary premises. In a preferred embodiment of the present invention, the system is designed for protection of stationary premises, and the unit includes inputs for connection to a plurality of different sensors for detecting different types of emergency situations. The sensors preferably include fire sensors, perimeter sensors for detecting opening of doors or windows, for example, and a panic switch for activation by an individual within the enclosed area in the event of a medical or other emergency. The sensors may optionally include space sensors for detecting movement within the enclosed area. The processing unit is programmed to determine the type of alarm detected (fire, break-in, panic) and to transmit a corresponding alarm signal containing the alarm type information to the transceiver for transmission to the central monitoring station. Since the communication is wireless, at least from the monitored premises to the local cell site, the alarm system cannot be avoided by intruders cutting telephone wires at the site.

Preferably, the system also includes an arm/disarm module for remote arming and disarming of the system. A small transmitter unit designed to be hand held has suitable buttons or switches for arming or disarming, and will emit either an "arm" signal or a "disarm" signal on alternate operation of the transmitter button by a user. The arm/disarm module is arranged to detect the "arm" or "disarm" signal and to transmit it to the signal processing unit in order to activate or deactivate the alarm monitoring, as appropriate. Thus, the operator of the alarm system can readily arm and disarm the system from a remote location outside the building, considerably reducing the risk of false alarms or mistakes since no password has to be memorized and the transmitter key is unique to this user.

In the preferred embodiment of the present invention, the signal processing unit and transceiver unit are all contained in a single outer housing or enclosure, similar to a standard cellular phone enclosure, and the cellular phone unit can be operated as a standard cellular phone during normal conditions when no emergency has been detected. The cellular phone can still be used after detection of an emergency. The transceiver is therefore programmed to intermix the emergency signal transmission with any voice transmission over an assigned voice channel. This allows the owner to talk to an operator at the central monitoring station. The system thus comprises a unique, alarm detecting cellular phone. The cellular transceiver and alarm monitoring and signal generating and transmitting functions are integrated into a single modular unit.

The system will have a "listen-in" capability whereby an operator at the central monitoring station can either talk to a person at the alarm location or listen to voices or noises in the vicinity of the cellular telephone unit. The cellular phone unit is therefore preferably of the type having a built-in speaker/microphone for hands-free operation, or a suitable speaker/microphone may be provided in the unit if necessary. This enables the operator at the central monitoring station to verify the existence of an emergency and also to maintain voice communications during an alarm period.

This alarm system provides reliable and accurate indication of an alarm condition to a remote monitoring station. Communication of the alarm signal cannot be cutoff or blocked by an intruder, since the radio frequency of transmission will not be known and will in any case vary from transmission to transmission, depending on the voice channel frequency assigned by a local cell site.

BRIEF DESCRIPTION OF THE DRAWINGS

The present invention will be better understood from the following detailed description of a preferred embodiment of the invention, taken in conjunction with the accompanying drawings, in which like reference numerals refer to like parts, and in which.

DESCRIPTION OF THE PREFERRED EMBODIMENT

An alarm system for protecting an enclosed area such as a home, office or other business site, or a vehicle, according to a preferred embodiment of the present invention, is illustrated in the drawings. The system basically comprises a unique, cellular alarm unit 10 which receives the outputs from various alarm sensors 12 and generates an alarm signal in response to a sensed output signal from any of the sensors. The unit 10 also establishes a connection to a remote central monitoring station 14 via a local cell site 16 on receiving an alarm output signal from any of the sensors, and transmits the generated emergency or alarm signal to the central monitoring station on establishment of the connection. During periods when no alarm has been detected, the unit 10 can be used as a conventional cellular phone for both making and receiving calls.

Figure 1:
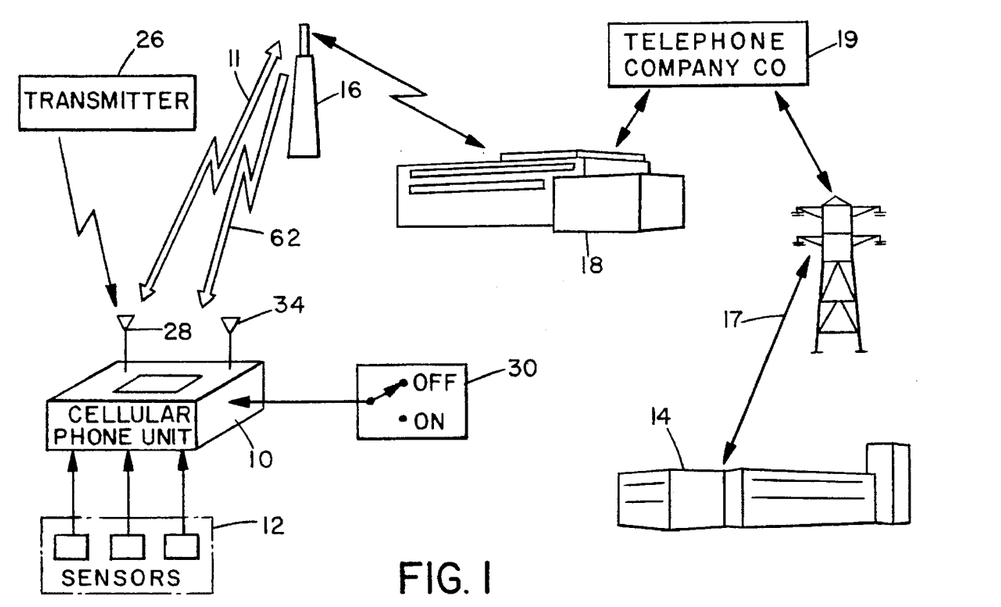
FIG. 1 is a schematic block diagram illustrating communication between an alarm unit forming part of an alarm system according to a preferred embodiment of the present invention and a central monitoring station.

Thus, this system makes use of the existing nationwide cellular telephone system consisting of a plurality of radio transmitters or cell sites 16 each covering a predetermined cell area. The cell sites covering a predetermined region are linked to a controlling mobile telephone switching office (MTSO) 18 and from there to the telephone company central office 19, as will be understood by those skilled in the field. Signals 11 emitted from unit 10 are transmitted to the closest adjacent cell site 16 and relayed from there over conventional telephone lines or wireless link 17 through the MTSO station 18 and telephone company office or switching station 19 to the central processing or monitoring station 14, as illustrated in FIG. 1.

Although in the preferred embodiment the cellular telephone network is used as a means for conveying wireless emergency signals, as will be explained in more detail below, it will be understood that other wireless communications systems may be used in alternative embodiments of the invention, for example the alarm unit may contain a transmitter for transmitting wireless signals via satellite communications.

Figure 2:
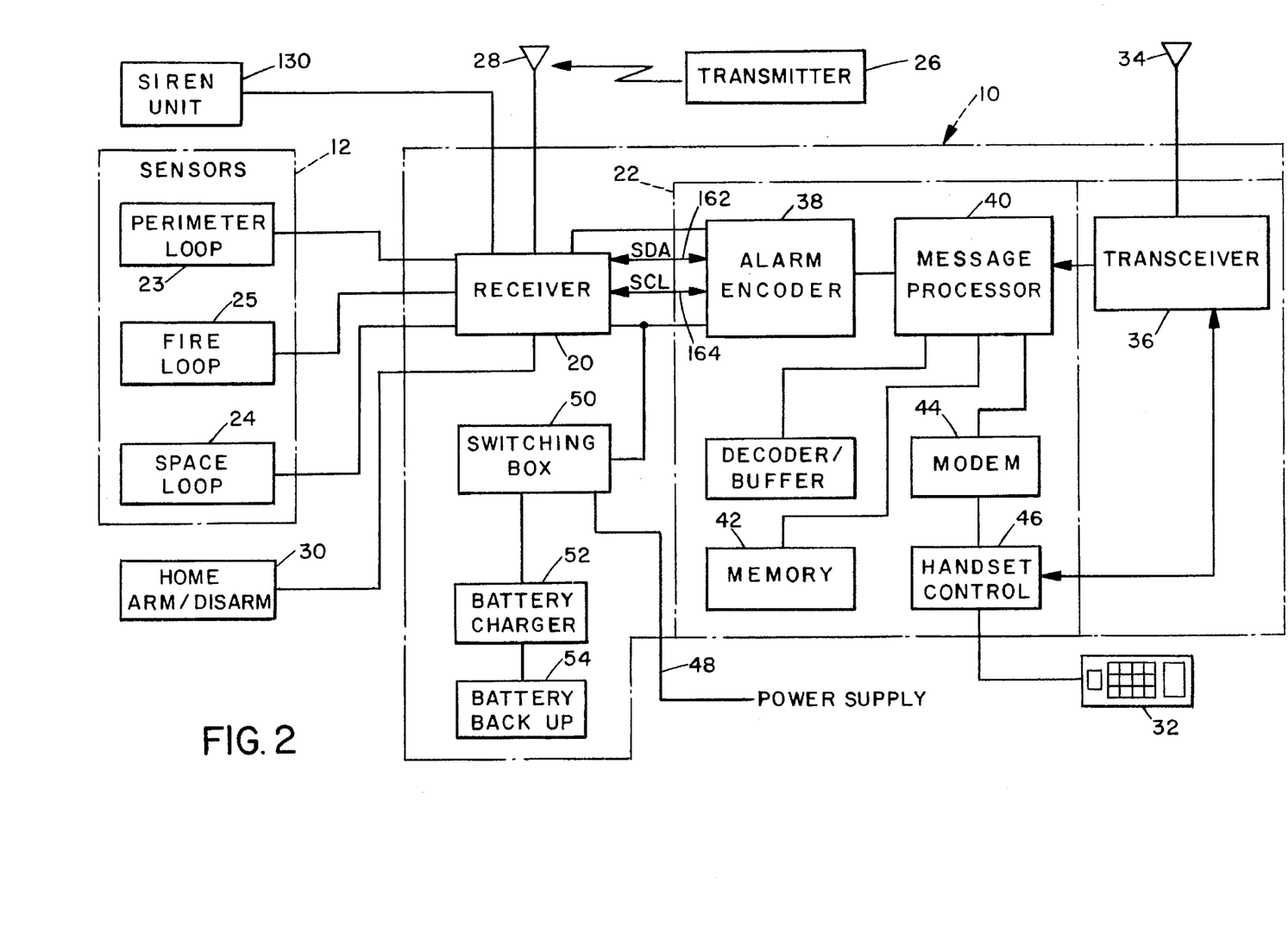
FIG. 2 is a schematic block diagram of the alarm unit of FIG. 1.

The cellular alarm unit or module 10 is illustrated in more detail in FIG. 2 of the drawings. The unit or module contains all the hardware and software necessary for normal cellular telephone communications, as well as hardware and software for detecting break-ins or fires and for transmitting emergency signals to the remote monitoring station in the event of an alarm detection. The unit basically comprises a receiver 20 for receiving incoming signals from various sensors 12, and a modified cellular transceiver device 22 which operates as a conventional cellular phone under normal circumstances and which transmits emergency signals on detection of an alarm condition.

Figure 5:
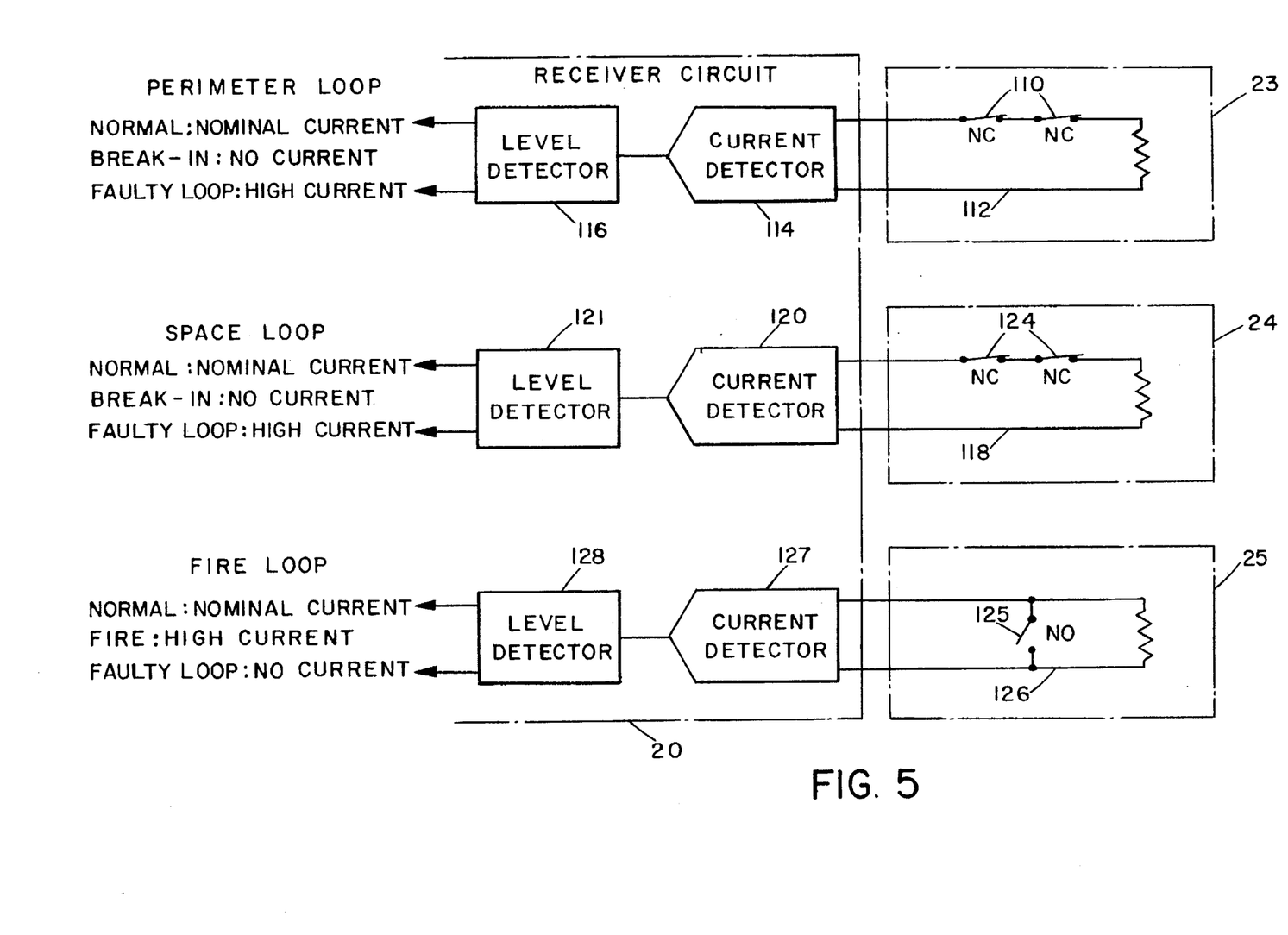
FIG. 5 is a schematic block diagram illustrating the alarm circuit loops of the system.

In an alarm system for protecting a building such as a house, office, school, or other business, there will typically be perimeter sensors at doors and windows to detect unauthorized entry to the building or enclosed area, space sensors for detecting movement within the area, and fire or smoke sensors for detecting fire. In the system of this invention, any conventional type of perimeter sensors 23 are installed at the doors and windows of the area to be protected. Preferably, these are of the magnetic switch type and are connected in a circuit loop to the alarm unit input, as best illustrated in FIG. 5, so that opening of any window or door will break the circuit, activating the alarm. As illustrated in FIG. 5, each of the individual magnetic switches 110 is connected in a circuit loop 112 to suitable current and level detectors 114, 116. In the normal monitoring situation, a nominal current level will be detected. In the event of a break-in, a break in the circuit occurs and no current is detected. In the event of a faulty loop, a high current is detected. Conventional space sensors 24 are provided at appropriate locations within the area for detecting movement. These may be of the infrared type, for example. Again these are preferably connected in a loop 118 connected via current and level detectors 120, 121 to the cellular alarm unit, so that activation of any one of the sensors will result in an alarm signal. Fire sensors 125 of a conventional nature are also positioned appropriately in the building and may be connected in a loop 126 via current and level detectors 127, 128 to the alarm unit. The system may be hard-wired or may use wireless communications. Each of the level detectors 116, 121 and 128 has two outputs, one indicating an ALARM condition, and the other indicating a faulty loop.

A remote arm/disarm transmitter 26 is provided for remotely arming or disarming the unit 10. Signals emitted from transmitter 26 are picked up by antenna 28 and conveyed to the receiver 20. The transmitter will be small enough to be carried easily in the owner's pocket or purse. A home arm/disarm unit or switch 30 is also provided at a convenient location in the building for allowing the owner to control operation of the system appropriately when within the building. This is also connected to the receiver 20. A siren or other audible alarm device 130 is also connected to the receiver 20 for actuation under certain alarm circumstances, as will be explained below.

The transceiver is connected to a conventional cellular phone handset 32 and to an antenna 34 for receiving and transmitting cellular phone signals as well as emergency signals when necessary. The modified transceiver device is microprocessor based and includes the transceiver 36 for transmitting and receiving the cellular signals. The outputs of receiver unit 20 are connected to alarm encoder 38 which contains conventional decode/debounce circuitry. The output of encoder 38 is connected to a transmit/receive message formatter or processor 40. The processor or message formatter is connected to a memory unit 42 which contains stored information on the unit I.D., the primary control center phone number, a secondary control center phone number, as well as other information. The output of the formatter 40 is connected via modem 44 and handset control 46 to the transceiver 36.

A 12-volt power source input 48 derived off a mains power outlet is connected to power the system via switching box 50. Switching box 50 is also connected via battery charger 52 to an internal battery back up 54 for operation of the system in the event of a power cut. The back up battery is recharged by the 12-volt power source. The switching box is designed to switch automatically from the primary power source to the battery back up in the event of a power cut.

Figure 3:
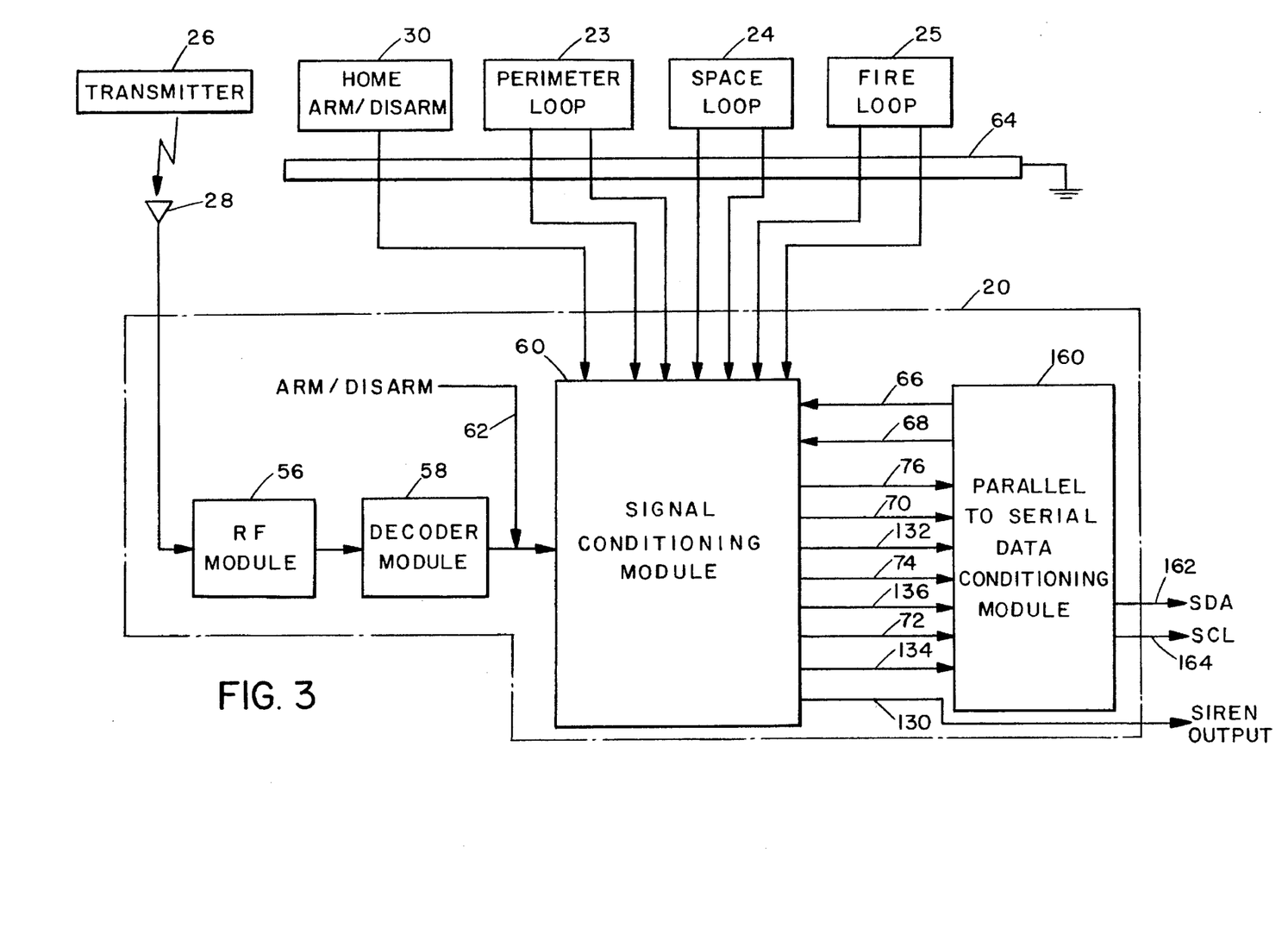
FIG. 3 is a more detailed block diagram of the receiver unit of FIG. 2.

The receiver 20 is illustrated in more detail in FIG. 3. Antenna 28 is connected via RF module 56 and decoder module 58 to a signal conditioning module 60 to provide an arm/disarm control input 62 to the module 60. The various sensor loops 23, 24 and 25 as well as the home arm/disarm 30 are connected via cellular phone connector 64 to the signal conditioning module. The module also has a remote reset input 66 and remote "ON" input 68 from the modified transceiver unit 22, which will be explained in more detail below.

Figure 4:
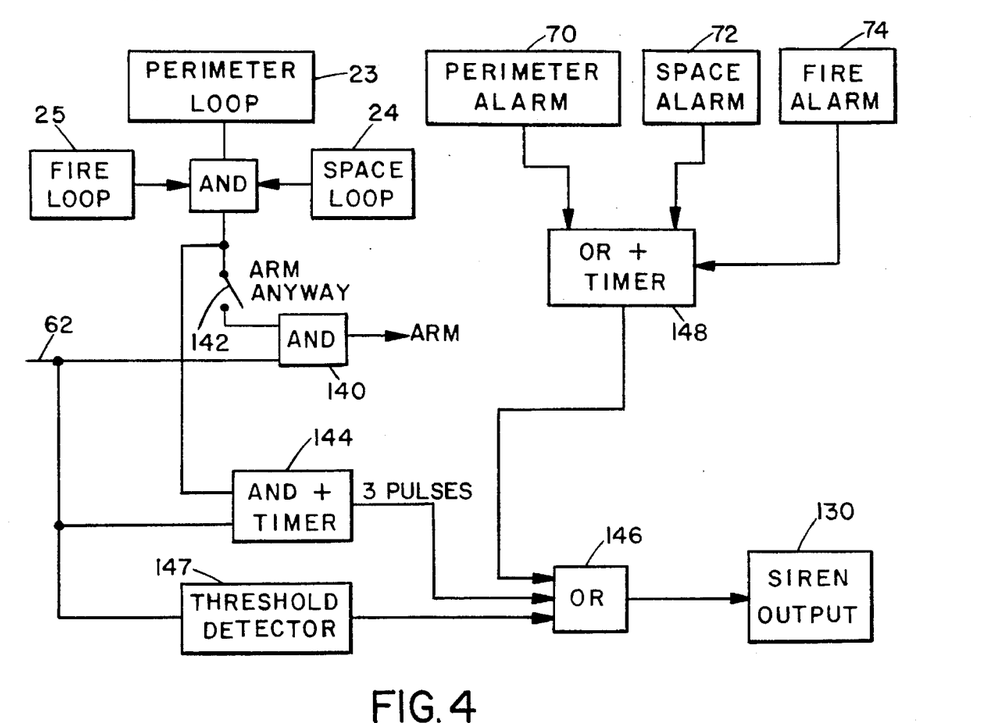
FIG. 4 is a schematic diagram of part of the logic functions in the signal conditioning module for controlling the arming and disarming of the system.
Figure 6:
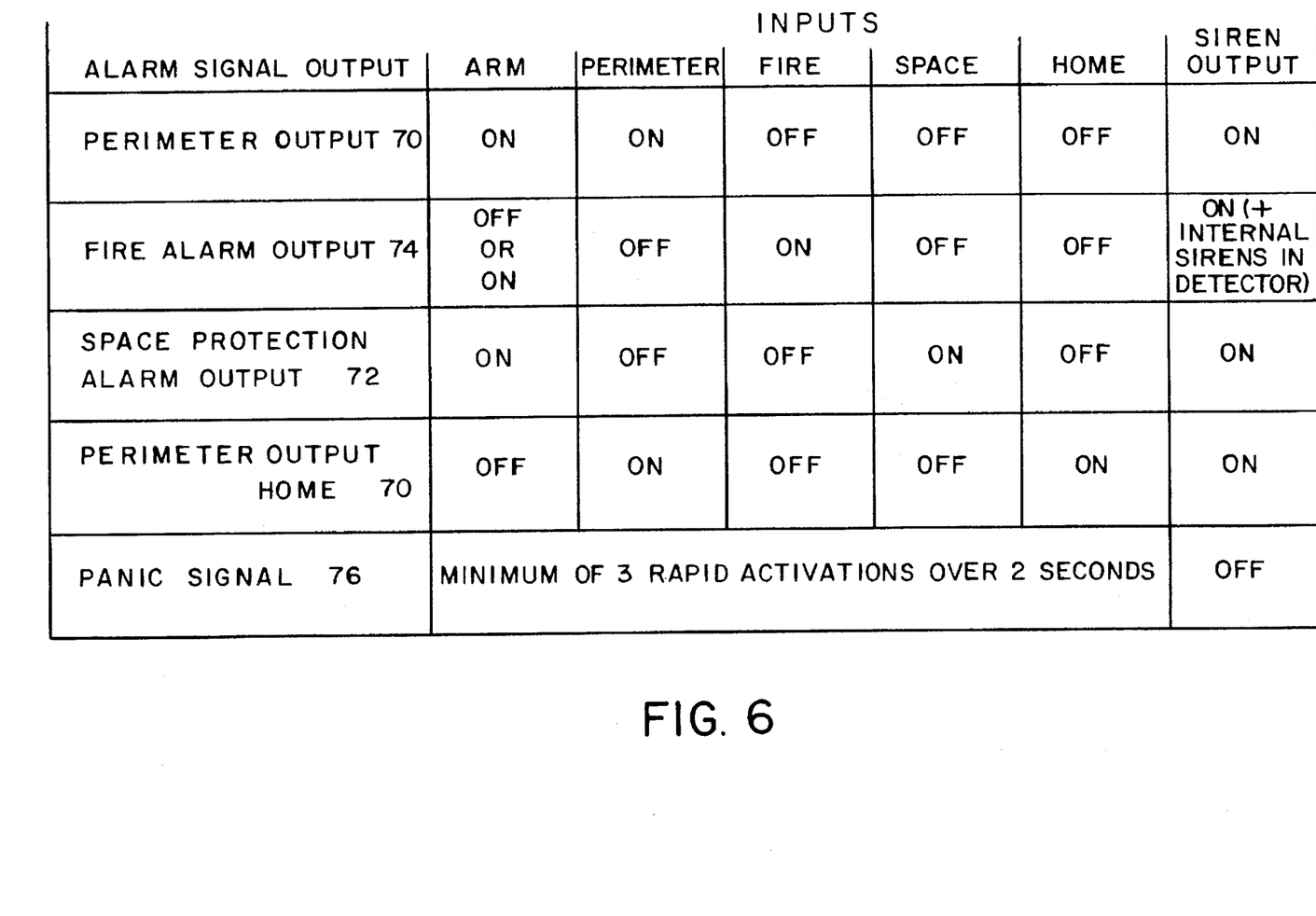
FIG. 6 is a logic diagram illustrating the functional operation of the signal conditioning module of FIG. 3 to produce the various alarm outputs based on the sensor and arm/disarm unit inputs.

Signal conditioning module 60 is programmed to produce or reset various alarm output signals based on the detected inputs 23, 24, 25, 30, 62, 66 and 68. This is best explained with reference to the truth table of FIG. 6. Perimeter alarm output signal 70 is produced when the remote ARM 26 or home ARM 30 is ON, and a perimeter sensor input ON condition is detected. Space protection alarm output signal 72 is produced when remote ARM 26 is ON and a space sensor ON condition is detected. The fire alarm output signal 74 is "armed" at all times regardless of the arm/disarm status of units 26 and 30, and will be produced whenever a fire sensor ON condition is detected. At the same time, the SIREN 130 will be actuated on detection of a break-in, as illustrated in FIG. 4. Activation of a fire or smoke sensor will activate the built-in siren in the smoke detector as well as the outside SIREN 130. Finally, a PANIC output signal 76 will be produced in the event of at least 3 rapid activations of unit 26 within 2 seconds or activation of a predesignated key on the cellular phone handset 32. Thus, the owner can initiate an emergency signal simply by pushing the button of unit 26 or handset 32 repeatedly.

FIG. 4 schematically illustrates the operation of signal conditioning module 60 to operate the siren 130. As best illustrated in FIG. 4, the signal conditioning module 60 is set up not only to activate the siren in the event of an emergency, but also to activate a series of three pulses from the siren 130 in the event that a person attempts to arm the system remotely while a door or window is still open or when any of the other alarm loops are not intact. This signal indicates that the system has not been armed. The person must then return to the building and check all doors and windows, closing any which remain open, and rearm the system.

The ARM signal 62 of decoder module 58 is connected to AND gate 140, which has a second input connected via "ARM anyway" switch 142 to the output of the perimeter loop sensors. The ARM signal 62 is also connected via invertor 143 to AND gate and timer 144, along with the perimeter sensor output. The output of gate 144 is connected via OR gate 146 to activate the siren 130. The perimeter, space alarm and fire alarm signals are connected to OR gate and timer 148, which has an output connected to the other input of OR gate 146. In the event that an ARM signal and a loop open signal are both input to AND gate 144, an output of three pulses will be produced, resulting in a series of three short sound pulses from the siren 130. At the same time, if arm anyway switch 142 is closed, the system will not be armed. In order to arm the system, the individual will have to return to the building, close any open door or window, leave the building, and press the ARM button of transmitter 26 again.

By opening switch 142, the user can override the ARM disable function and the system can then be remotely armed even if a window or door has been left open or any other sensor loops are not intact. Any intrusion in this situation will be detected by the remaining intact loop. However, the siren will still emit three pulses on arming, telling the user that one or more of the loops is not functioning.

A threshold detector 147 is provided to detect and distinguish between arm/disarm outputs of unit 26. Detector 147 senses low/high transition of transmitter 26. If a transition to high (TTH) is detected (ARM signal), a one pulse output is provided from the siren. If a transition to low (TTL) is detected (DISARM signal), the siren emits two pulses.

In addition to the alarm outputs, the signal conditioning unit 60 will produce "faulty" output signals on detection of a fault input from any of the sensor loops. Thus, perimeter faulty output 132 is produced on detection of a faulty perimeter loop, space faulty output 134 is produced on detection of a space loop fault, and fire alarm faulty output 136 is produced on detection of a faulty fire loop.

The various alarm outputs of the signal conditioning unit 60 are connected to a parallel to serial data conditioning module 160 which is designed to produce a serial code output on a conventional I$^2$C bus according to the sensor input. The module 160 provides SDA or data serial output 162 and SCL or clock output 164. These outputs are connected to the microprocessor 22 via the I$^2$C bus in a conventional manner.

At the conditioning module 160, each of the various alarm inputs will be assigned a numeric SDA code, for example according to the Table 1:

TABLE 1

| EVENT | SDA CODES NORMAL SET-UP | w/"ARM ANYWAY" | w/HOME SWITCH OFF |
| --- | --- | --- | --- |
| Perimeter alarm | 1 | 11 | 21 |
| Space alarm | 2 | 12 | 22 |
| Fire alarm | 3 | 3 | 3 |
| Perimeter fault | 4 | 14 | 4 |
| Space fault | 5 | 15 | 5 |
| Fire fault | 6 | 6 | 6 |
| Panic alarm | 7 | 7 | 7 |

A serial data output will be provided by module 160 dependent on the status of the various inputs, and is input to microprocessor 22 for conversion to an appropriate emergency signal.

The transceiver or microprocessor is programmed to produce a designated emergency message or signal based on receiving any one of the alarm codes on the serial SDA bus from the signal conditioning module, and to transmit that signal to a stored telephone number corresponding to the central monitoring station. During normal situations, the cellular alarm unit 10 can be operated as a conventional cellular phone. Operation of the system in this way is illustrated in the flow diagram of FIG. 7. The starting and normal (non-emergency) state of the system is the passive off state 80. In this state, the user can initiate or receive calls 82, and the unit operates normally 84 in the manner of a conventional cellular phone. On call completion 86, the unit is returned to the passive off state 80.

Figure 7:
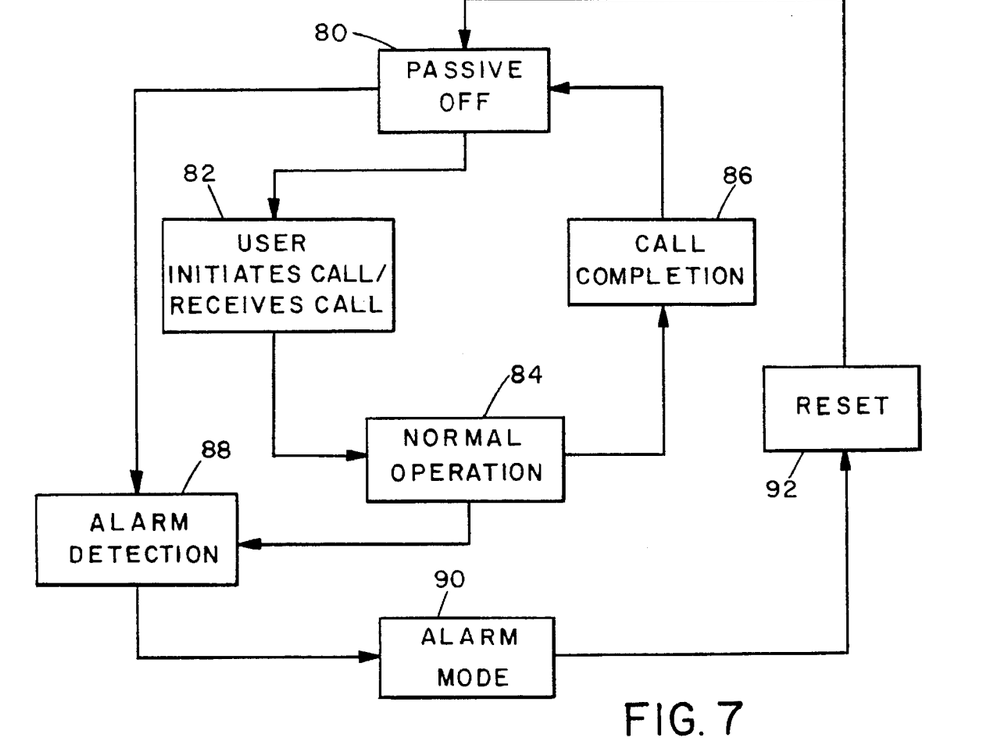
FIG. 7 is a flow diagram illustrating operation of the system.

If an alarm 88 is detected via any of the sensors 23, 24 or 25 or via rapid activation of unit 26, the unit enters the alarm mode 90. This mode can be entered either from the passive off state 80 or during normal cellular phone operation 84. In the alarm mode, the system is programmed to generate an appropriate alarm data packet based on the type of alarm signal detected (perimeter, space, fire or panic) and the information stored in the memory 42. The data packet will be generated in computer-readable, ASCII digital format, and will comprise a unit I.D. number, system owner information, time of transmission, type of alarm and packet number. At the same time, the unit will call a designated primary telephone number corresponding to the central monitoring station. If unable to establish a connection to that number, the system will try the same number again up to two times, and if still unsuccessful, will try a secondary telephone number at the monitoring station for up to two times. This is repeated continuously until a connection is established.

Once connection is established, the data packet is converted into a wireless transmittal signal via modem 44 and transmitted from transceiver 36. The use of a modem 44 in the cellular phone and alarm unit 10 allows for direct connection to a modem at the monitoring site, which converts the data back into computer-readable form. Consequently, the data packet can be directly input via modem to a remote PC computer. This has an advantage over conventional alarm systems in the alarm industry, which transmit data using DTMF tones, so that the received data is not computer readable. Thus, in such systems, the monitoring site must have specially designed digital receivers to receive the DTMF alarm signals and convert to computer-readable format. The digital receivers are connected to computers. The unique cellular alarm unit 10 with built-in modem allows transmission directly to the computer at the monitoring site.

The alarm message packet will comprise the unit I.D., time of transmission, type of alarm, and packet number. This message packet will be transmitted repeatedly at intervals of around 10–30 seconds until a reset command 92 is received. The reset input is provided from the remote monitoring station, allowing the operator there to command the system to exit from the alarm mode once the emergency has been dealt with or the user himself can reset the alarm by disarming transmitter 26. The reset command will also reset the signal conditioning module via input 66 provided for this purpose.

The operator at the central monitoring station will therefore be able to determine the location of the emergency as well as the type of emergency, and can quickly dispatch the appropriate personnel to deal with the situation. A street map is displayed on the computer screen and the operator has the ability to query the map to identify the location of the address as keyed in by the operator, or conversely, the operator may know the address of a fixed site location since the computer database contains such information based on the user's I.D.

In the preferred embodiment of the invention, the system is programmed to permit "mixing" of the data and voice signals and simultaneous transmission of voice and data on the same single link and at the same time. This allows the operator to listen in to the alarm site and/or talk to the home owner, in order to qualify the event and prevent false alarms. It also permits a person in distress at the site to communicate with emergency personnel and convey apprehensions or information to the remote operator. The system has two modes of data and voice mixing:

1. "Listen-In" is a mode invoked automatically whenever an alarm condition is initiated automatically.
2. Subscriber initiated request is a mode whereby a subscriber in distress may activate a request for help. When he terminates voice communications, the alarm/location data will continue to be transmitted until the alarm condition is reset.

For either of the two modes above, data and voice need to be mixed when the remote site calls the remote monitoring station. On the other hand, when the operator calls the subscriber at the remote site, voice can be completely separated from data by the operator, by depressing an appropriate function key when he is not talking.

Since communication on the link between remote site and monitoring station is two-ways, voice and data wise, the link is "full duplex", meaning it can accommodate simultaneous data/voice calls back-and-forth between remote site and monitoring station, with the exception that both the monitoring station and remote site can only send either data or voice at any one time, otherwise data from monitoring station to remote site and vice versa will be garbled.

Figure 8:
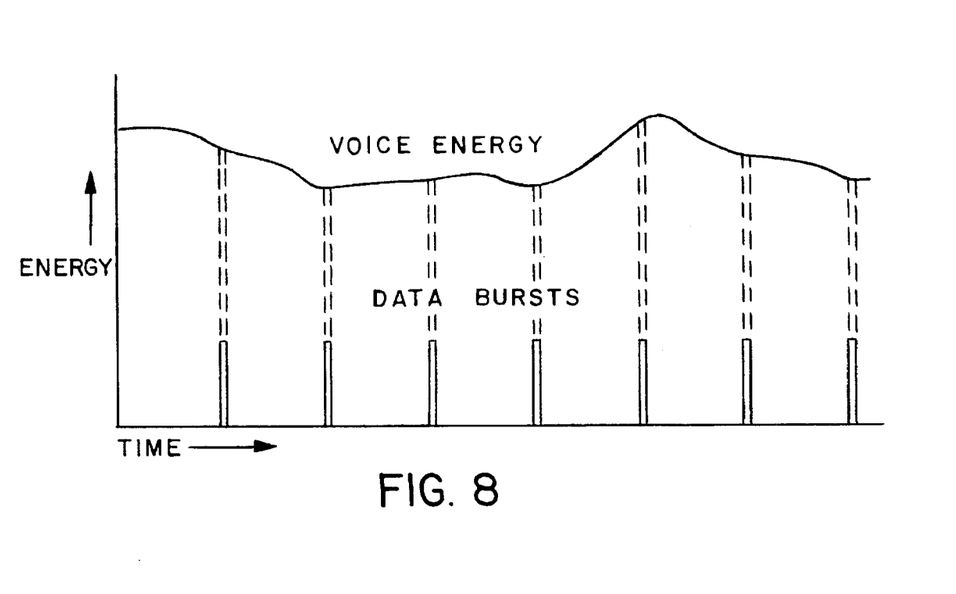
FIG. 8 is a graphical representation of the data and voice mixing used in emergency situations.

The transceiver unit at the protected site is programmed to mix data and voice automatically as necessary. The mixing of data and voice is achieved by interleaving the data and voice, using time-sharing techniques, as illustrated in FIG. 8. Short data bursts (in the hundreds of milliseconds) are transmitted in 10-second intervals approximately. While the data bursts are transmitted, the voice transmission is blanked or muted momentarily. Because of the short blank or muting duration, voice legibility and integrity is maintained.

The system permits simultaneous transmission and reception of voice and computer-readable data over a single cellular voice channel or line. The cellular phone unit transmits caller voice signals simultaneously with the digital alarm signal containing data identifying the caller premises, alarm status, location or any other pertinent information.

The interleaved data/voice received at the monitoring station is filtered by the monitoring station communication interface by using data burst "header" characters which serve as "flags" indicating a start and end of data burst. The data is routed to the monitoring station computer network, whereas the voice is routed to the respective operator telephone.

Thus, if voice input to the system is occurring at the same time as the data transmission, the system will transmit voice signals continuously in the gaps between emergency message transmissions, and will mute the voice signals during the emergency data transmission periods. This time period is so short that little information will be lost and the human ear will be unlikely to detect the gaps.

In order to allow for simultaneous voice and data transmission and reception, the cellular phone unit must be modified and the monitoring station is provided with a specialized modem to receive the voice/data signal on one line and to separate the data from the voice, routing the voice to the monitoring station operator's headset and routing the data to the monitoring station computer's input port. FIGS. 9–13 illustrate the software and hardware modifications to the system to permit voice/data transmission and reception.

Figure 9:
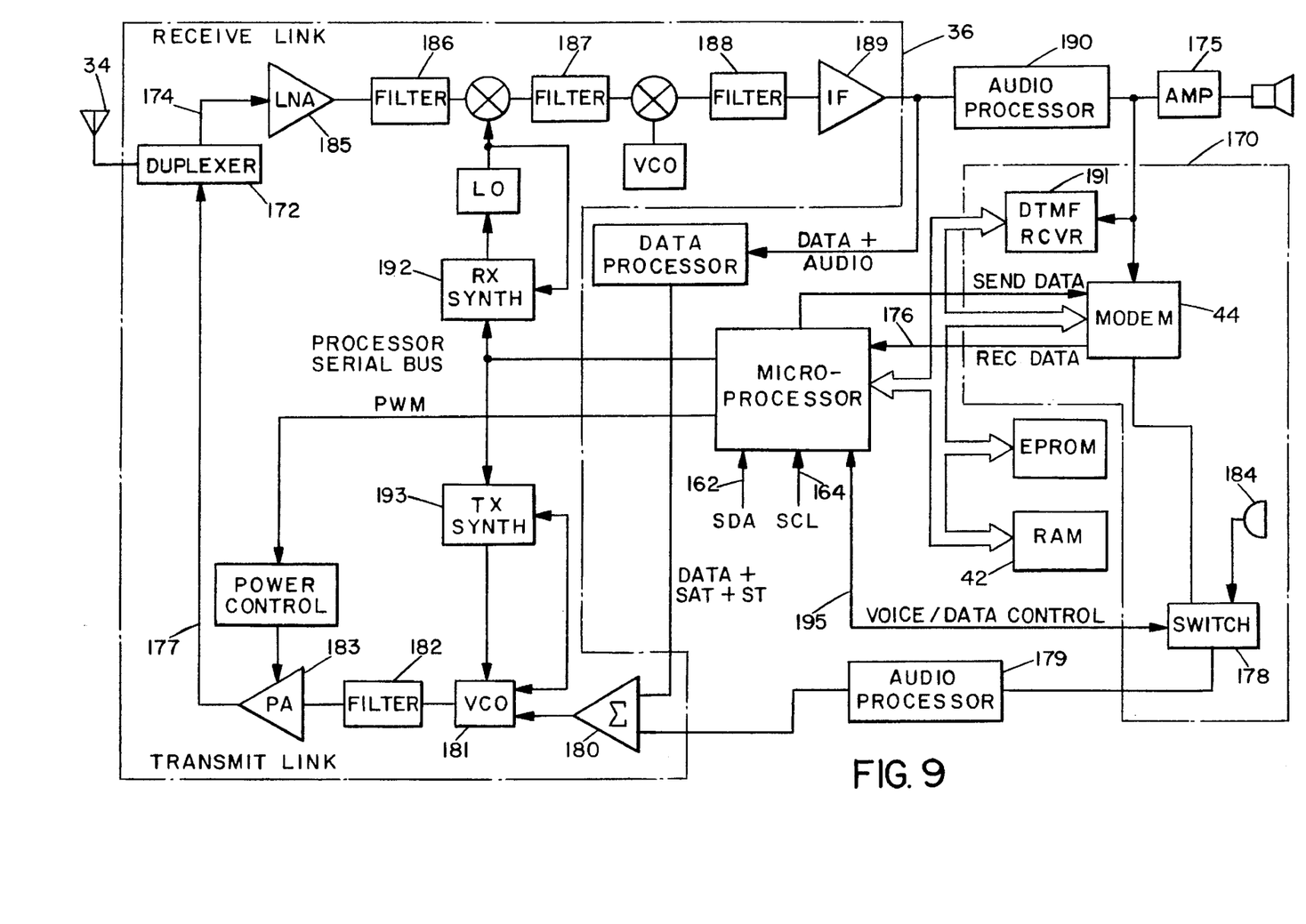
FIG. 9 is a schematic block diagram illustrating the data/voice integration at the alarm unit.

FIG. 9 illustrates a cellular phone unit similar to that of FIG. 2 but in greater detail, and with additional hardware 170 for transmitting a combined voice/digital computer data signal on one line or wireless link. The transceiver 36 is a conventional cellular phone transceiver and the individual components will therefore not be described in any detail. Signals received at antenna 34 are transmitted via duplexer 172 along receive line 174 to the audio output or speaker 175 of the cellular phone and via modem 44 to the data receive line 176 of the microprocessor bus. Output signals from the cellular phone are transmitted to the antenna 34 via transmit link 177 through duplexer 172.

The microprocessor 22 receives sensor inputs indicating any alarm condition on SDA line 162 from the receiver 20, and will convert any such inputs into a suitable computer-readable emergency message containing information on the site and type of alarm. The message will include a suitable header code or flag at the start and footer code or flag at the end of the data transmission. This message or data is provided to modem 44, where it is converted into a transmittable format. Switch 178 controls the connection of the data output from modem 44 to the transmit link via audio processor 179, adder 180, VCO 181, filter 182 and power amplifier 183. Switch 178 is a single pole, double throw switch and has a single output or pole connected to the transmit link, and inputs connected to modem 44 output and to the microphone or audio input 184 of the cellular phone. A control output 195 from the microprocessor 22 will control the position of switch 178 according to stored program instructions.

The receive link includes conventional low noise amplifier 185, and a series of band pass filters 186, 187, 188, limiter 189 and audio processor 190. The output of audio processor 190 is connected to the modem 44, speaker and amplifier 175 and also to a DTMF receiver 191 which is also connected to the microprocessor bus. The DTMF receiver 191 is used for receiving remote commands from the central monitoring station for controlling signal transmission. This will override the on-site programmed control of the data/voice transmission, and may be used if necessary so that only voice, only data, voice and data or a host of other commands, may be transmitted at the operator's request.

The microprocessor also has a serial bus output to receive synthesizer 192 and transmit synthesizer 193, connected to the receive and transmit links, respectively, as in a conventional cellular phone.

Figure 10:
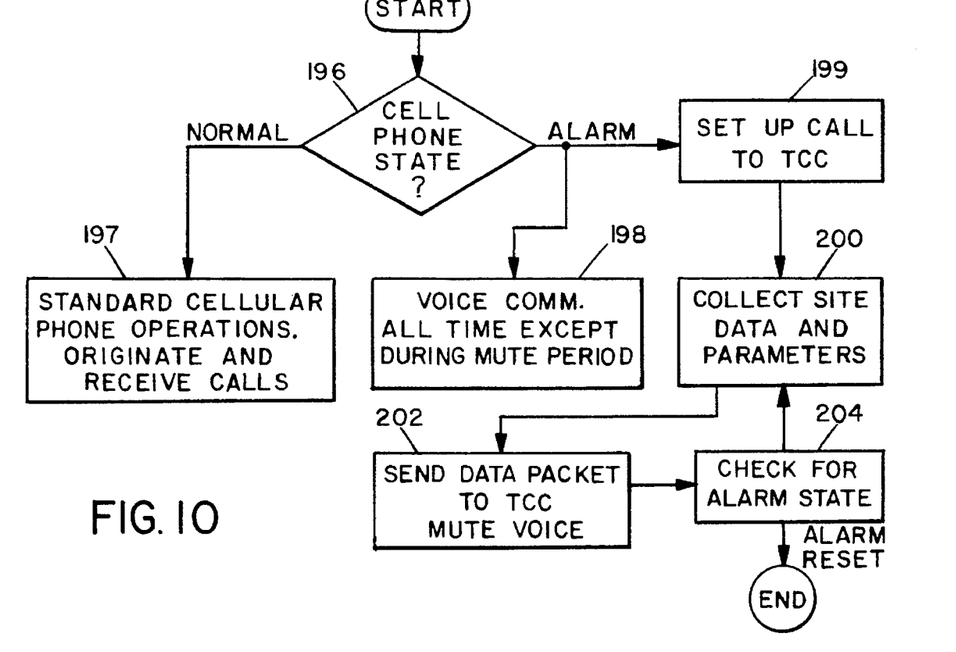
FIG. 10 is a flow diagram illustrating data/voice integration for a home alarm unit.

FIG. 10 is a block diagram illustrating the software for implementing the data/voice integration in a fixed site system as illustrated in FIGS. 1–9. The first step 196 determines whether the cellular phone is in the normal or alarm mode (see FIG. 7). Normal cellular phone operations 197 of originating and receiving calls are carried on unless an alarm state is detected. On detection of an alarm mode, voice communications are initiated (198), and a call is initiated to the central monitoring station (step 199). The data is collected for establishing the alarm data packet (step 200). The data packet will include a header and footer flag, as noted above. The data packet is then transmitted to the central monitoring station, and the switch 178 in this case operates to mute or turn off the voice during data transmission (step 202). After transmission of the data packet, the switch 178 is controlled to again connect the microphone or audio input to the transmit link. The alarm state is rechecked (step 204), and if an alarm condition is still in existence, steps 200 and 202 are repeated after a predetermined delay. The time period required to transmit the data packet will be of the order of 460 ms, and the voice only needs to be muted during this period. Data packets will be transmitted at approximately 10 second intervals during an alarm. Voice can continuously be sent during the time in which the processor generates the data packet. The time period during which the data packet is sent is brief so that the human ear will lose little voice information.

This arrangement permits both voice and digital computer data to be transmitted via a single cellular phone link, at the same time, and in real-time, to a monitoring station where the combined input can be deciphered for further processing.

In my U.S. Pat. No. 5,218,367 and in my co-pending application Ser. No. 08/284,177 filed Aug. 2, 1994, a mobile alarm unit tracking system is described which was also incorporated in a modified cellular phone unit. The unit is linked to sensors for detecting break in or towing, and also included means for generating tracking signals for allowing a monitoring station to track stolen vehicles. The present alarm system does not utilize tracking, since it is designed for use in stationary premises. However, the same basic alarm module may be designed for use either in a vehicle tracking system or a stationary premise alarm system, and can be switched to the required mode of operation on installation. Thus, referring to FIG. 3, the module will also be provided with a towing sensor input to the signal conditioning module, which will produce a towing output signal as appropriate. It will also be provided with the tracking capabilities as described in my U.S. Pat. No. 5,218,367 and co-pending application Ser. No. 08/284,177, the contents of which are incorporated herein by reference.

Figure 11:
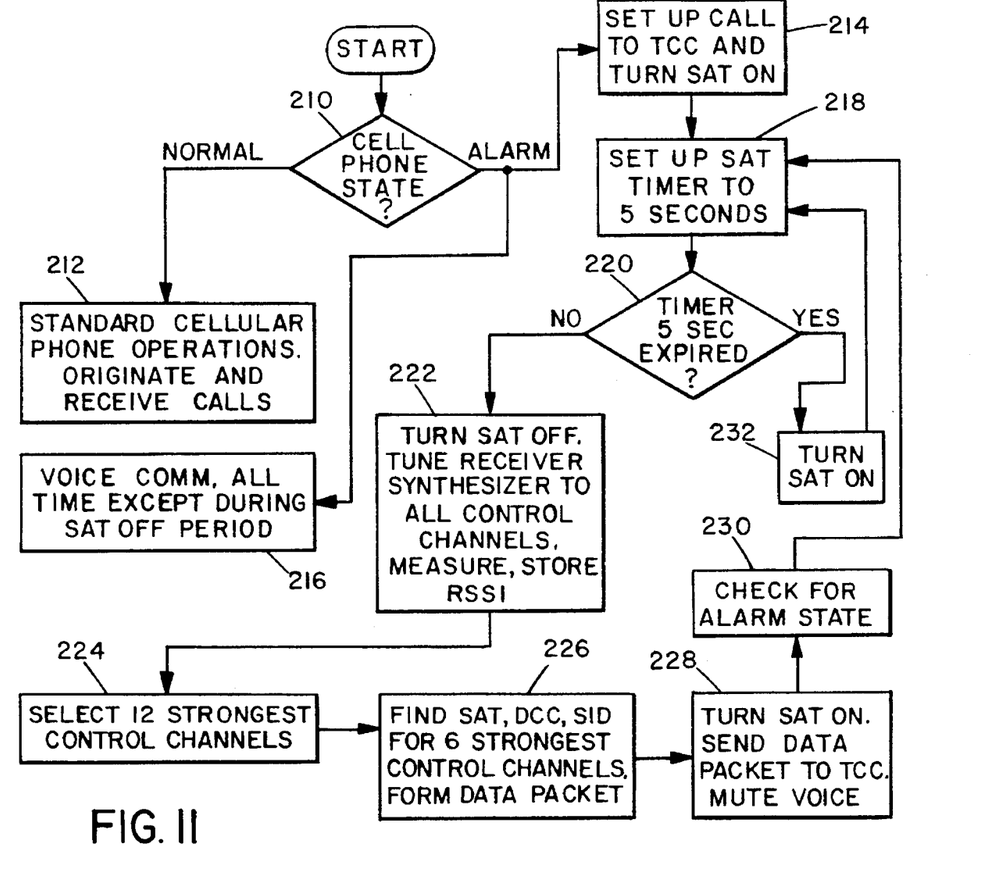
FIG. 11 is a flow diagram illustrating data/voice integration for a mobile alarm unit.

FIG. 11 is a flow chart illustrating the modified software for controlling voice/data signal transmission in a mobile alarm unit. Unlike the fixed site situation, in a mobile alarm unit the system must scan neighboring cell sites as described in my co-pending application Ser. No. 08/284,177 referred to above and determine the strongest channels, and these must be included as part of the data packet so that an approximate location for the unit can be determined at the central monitoring station. During scanning, the SAT, or supervisory audio tone, must be turned off. As in FIG. 10, the system first determines the state of the cellular phone (step 210). In the normal state, standard cellular phone operation is provided (step 212). If an alarm state is detected, a call to the designated monitoring station is set up and the SAT is turned on (step 214). At the same time, normal voice communication is permitted (step 216). An SAT timer of 5 seconds is set up (step 218). Step 220 determines whether the 5 seconds has expired, and, if not, the scanning routine commences at step 222. In step 222, SAT is turned off. This will also turn off voice communications. The receiver is tuned to all available control channels, and the RSSI is measured and stored for each control channel received. In step 224, the twelve strongest control channels are selected. The SAT, DCC and SID for the six strongest channels are then determined, and the alarm data packet is generated including this information (step 226) as well as the start and end flags or codes, the alarm information, and so on.

After the data packet has been generated, SAT can be turned on again and the data packet is transmitted to the central monitoring station (step 228). The alarm state is checked (step 230), and the process is repeated to transmit alarm data packets periodically to the central monitoring station. In one embodiment, data packets are transmitted at approximately 10 second intervals.

During the scanning step 222, the cellular phone unit "listens" to all 42 possible frequencies of cellular control channels, and stores pertinent information on the strongest signals received, such as control channel identifier, signal strength and other identifying codes. The scan time and tuning time will be about 2 seconds, although newer and faster electronic scanning circuits will reduce the scan time to 150 milliseconds. Tuning time is used to verify that the received cell site control channels are valid and not a "ghost" as a result of "bleeding" phenomenon.

The use of the 5 second timer is to ensure that the SAT is never off for a period of more than 5 seconds. If the timer 5 seconds expires, SAT is turned back on in step 232, regardless of the scanning status. Since the scan will normally take much less than 5 seconds, this will not generally be a problem. SAT may be disconnected for periods of less than 5 seconds without dropping a call. By ensuring that all scanning takes less than 5 seconds, and by restoring the SAT if scanning time exceeds 5 seconds, the modified cellular phone unit conforms with the IS-553 standards for cellular phone networks. This arrangement is significantly less expensive than the alternative of providing a separate receiver in the cellular phone to receive data continuously and simultaneously with the cellular phone receiver receiving the voice.

Voice communication will be cut off during the SAT off period while scanning takes place, and will be muted during the data packet transmission. This will result in some degradation of voice quality, but will be of benefit to a caller in distress who is effectively in continuous communication to the operator at the central monitoring station. The operator can provide the caller with some degree of comfort and support, while at the same time the computer receives data on the alarm status at the fixed or mobile site, as well as site location information, and the operator can dispatch assistance to the site as appropriate.

Figure 12:
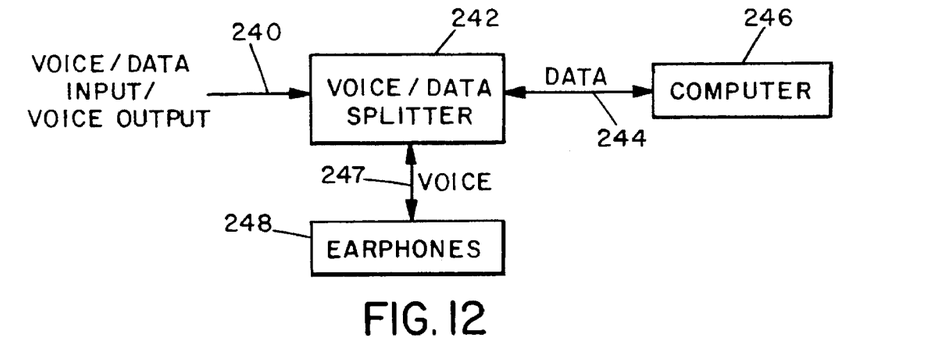
FIG. 12 is a schematic block diagram illustrating the data/voice receiver at the central monitoring station.

As generally illustrated in FIG. 12, the combined voice/ data signal is received via the phone line 240 at the central monitoring station, and is input to a specialized modem 242 comprising a voice/data splitter or switch. Voice/data switch 242 has a data input/output 244 to the remote site or host computer 246, and a voice output 247 to the operator's earphones 248. The voice/data switch is a microprocessor based device which connects to a standard, voice-grade phone line carrying time-division multiplexed voice and data information and separates that information, passing the voice portion of the signal to the earphones and sending the data to an RS-232 serial data port connected to a host computer, after appropriate demodulation and serial processing.

Figure 13:
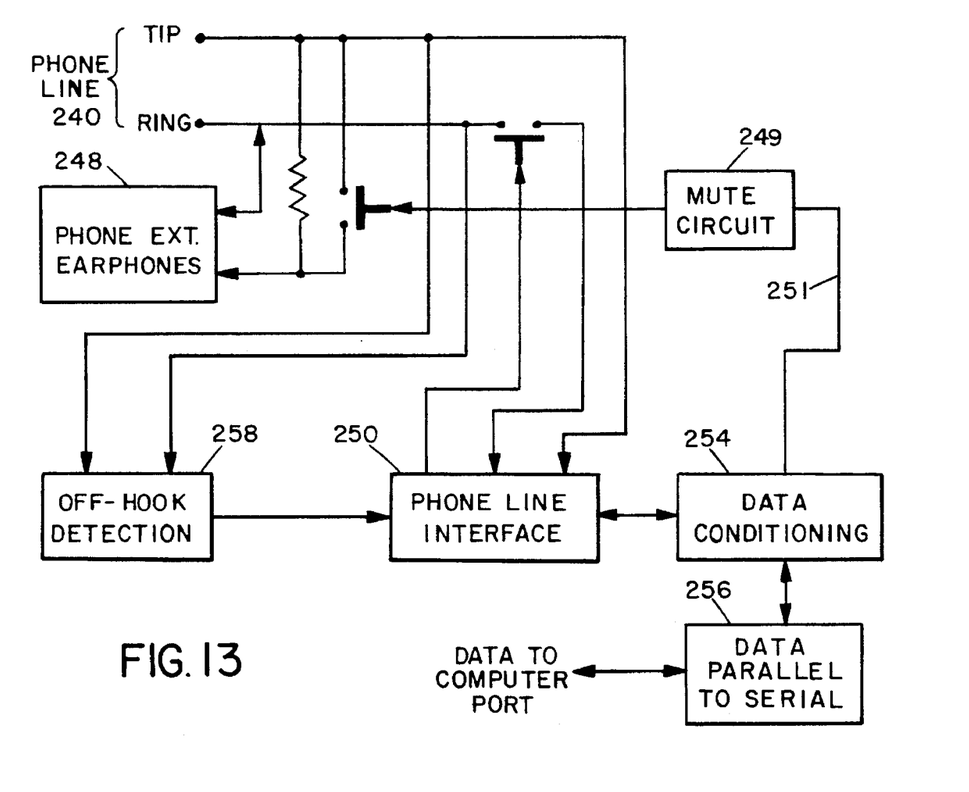
FIG. 13 is a more detailed block diagram illustrating the data/voice separation at the monitoring station.

The voice/data splitter or modem 242 is illustrated in more detail in FIG. 13. Combined voice and data is received at the phone line 240 and is passed on to the operator's earphones 248. The same signal is also connected to phone line interface 250, which looks for the data packet header flag or code. As long as the data header flag is not detected, voice is passed uninterrupted to the earphones 248. However, as soon as the lead characters indicating the start of a data packet are detected, a mute circuit 249 is triggered to mute the voice to the earphones. The mute circuit is triggered when its input 251 is made low. The mute circuit includes a mute relay which is closed to shunt the telephone set with an AC impedance, such as a capacitor, effectively muting audio to and from the telephone headset.

The data packet is connected from phone line interface 250 to data conditioning module 254 and parallel-to-serial data converter 256. The output of converter 256 is connected to a computer serial port. The data conditioning module is a one chip modem providing modulation and demodulation functions, and all of the other control signals needed for serial port functions. The converter 256 converts the parallel data to serial data so that it is computer serial port compatible. Off-hook detection circuit 258 ensures that the analog signal from the phone line is connected to the phone line interface through activation of an off-hook relay.

When the characters indicating the end of the data packet are detected at the phone line interface, the mute circuit is turned off and normal voice reception is provided at the earphones. Since the length of the data packet will typically be of the order of only 460 ms., the gaps in the voice input will in practice not be that noticeable to the operator.

This system allows voice and data to be transmitted simultaneously, real-time, via a single phone line or cellular link, and to be separated at the monitoring station.

Thus, with this system, the owner who is at home during an emergency such as a break-in or medical emergency is not cut off from communicating with emergency personnel, but can use the phone to convey apprehensions or information to the operator at the monitoring central station. The cellular phone unit is preferably of the type incorporating a built-in speaker/microphone to allow hands-off operation. The system is preferably set up to allow the operator at the monitoring central station to "listen-in", or activate the speaker/microphone so as to detect sounds in the vicinity or to talk to the owner in the event of a medical emergency or the like.

Once the operator acts on the alarm, they send a remote reset command 92 to the unit, causing the unit to exit the alarm mode and return to the passive off state awaiting the next call or next sensor input.

This alarm system can be used to protect stationary premises such as private homes, offices, light industrial structures, and the like. It is relatively inexpensive but reliable, and cannot be circumvented readily by cutting telephone wires, for example, unlike other conventional alarm systems. The cellular communication system is immune to an easy compromise of the cellular communication link since the radio frequency of transmission will vary from channel to channel and it will be impossible for an intruder to determine which particular channel will be used to communicate the break-in.

Once the system has been set up, the occupant of the premises to be protected can readily arm and disarm the system via the remote wireless transmitter which is small enough to be carried at all times on a key chain or the like. Thus, on leaving the premises, the owner simply presses the button to arm the system. On return, the disarm button is pressed to disable the perimeter and space sensors, so that the owner does not accidentally trigger a false alarm. The fire loop output is active at all times, and is independent of any arming or disarming inputs. When inside the building, the owner can use the HOME arm device to arm the perimeter sensors, while leaving the space sensors inactive. If an emergency arises at any time while the owner is inside the building, such as an accident or medical emergency, the owner simply presses the ARM/DISARM transmitter button rapidly several times to initiate a Panic signal output.

In this alarm system, all the elements needed for the system, apart from the sensors, are contained in a single enclosure. There is no need for a separate keypad, control panel or digital communicator, making the unit inexpensive, simple to use and install, and reducing or avoiding the risk of user errors initiating false alarms. The main alarm unit basically comprises a unique cellular phone unit which includes fully integrated hardware and software for providing communication of a detected emergency to a remote monitoring station, in a single unit. The unit can be used as a conventional cellular phone when not in its alarm mode.

The system of this invention is completely different from prior art fixed site alarm systems in a number of respects. The most significant difference is that the data is transmitted in a computer-readable format, or ASCII code, in this system, unlike existing alarm systems in which data is transmitted from the premises to the monitoring site in DTMF tones. The system of this invention does not use DTMF tones to transmit the data. Existing alarm systems utilizing DTMF tones are restricted in the size, format and content of the message due to the constrictions of the DTMF format. Additionally, the data is received at the monitoring station in DTMF format, so that it is not directly computer readable. Thus, in existing alarm systems, the monitoring station must use a non-standard, relatively expensive device known as a digital receiver in order to convert the DTMF input into a format which can be received by a modem or computer port. DTMF is also a slow transmission method, and is not good for transmission of long data messages. These limitations are eliminated in the alarm system of this invention, which transmits data in computer-readable format which can be used by any computer, and with no limitations as to packet size, format or content.

Another difference between the system of this invention and conventional prior art site alarm systems is that the system of this invention is not controlled via a keypad. Incorrect keypad inputs are responsible for 60% or more of false alarms. In this system, the system is armed and disarmed remotely from a keypad, or via an on/off button in the site or home. Since no keypad is used, an intruder has no way of tracing the alarm unit, and it can be hidden anywhere in the premises.

Additionally, with this alarm system, the user will hear a unique, audible signal of beeps or chirps if an attempt is made to arm the system while any entries are open. The system also permits the user to bypass the block to arming the system if an entry is open, by closing an "arm anyway" switch to arm the system even if an entry is open.

Since operation of the system is relatively simple, the likelihood of false alarms is reduced. Additionally, because voice and data can be transmitted simultaneously during an alarm, the operator is able to verify events at the site so as to eliminate any false alarms before anyone is dispatched. This avoids the worry of potential police non-response or slow response which could occur in the event of an excessive number of false alarms.

Although a preferred embodiment of the invention has been described above by way of example only, it will be understood by those skilled in the field that modifications may be made to the disclosed embodiment without departing from the scope of the invention, which is defined by the appended claims.

We claim:

1. A combined cellular phone and alarm device, comprising:

a cellular phone transceiver means for receiving and transmitting wireless cellular telephone signals via a cellular telephone network;

an alarm signal receiver means having at least one digital input for connection to a sensor for detecting an emergency condition in an enclosed area, and a digital alarm output in response to detection of said emergency condition;

a signal processing unit linked to the alarm signal receiver means output for generating an alarm signal in response to said alarm output, the alarm signal comprising a computer-readable ASCII digital data packet in RS-232 protocol;

control means responsive to said alarm output for establishing a wireless link to a predetermined central monitoring station via said cellular telephone network on detection of said emergency condition;

an RS-232 compatible modem linked to said signal processing unit and having an RS-232 input for receiving said digital data packet and a signal output linked to said transceiver means, said modem comprising means for converting said ASCII digital data packet to a wireless transmittable form;

a cellular phone handset linked to said transceiver means;

said signal processing unit further comprising means for operating the device as a conventional cellular phone in a normal mode when no emergency is detected, and for converting the device to an alarm mode when an emergency is detected, in which conventional cellular communications are discontinued, said alarm signal is generated, and said wireless alarm signal is transmitted via said link over said cellular telephone network; and said processing unit further including voice/data integration means for controlling said transceiver means to transmit voice signals and said converted ASCII digital data packet simultaneously over the same wireless link and at the same time.

2. The device as claimed in claim 1, wherein said alarm signal receiver means includes means for detecting remotely generated, wireless arm and disarm signals, and said processing unit includes means for arming or disarming the sensor input of said alarm signal receiver means on receiving said arm and disarm signals, respectively.

3. The device as claimed in claim 2, including an audible signal unit linked to said processing unit for generating an audible output when predetermined conditions are met, the alarm signal receiver means having a plurality of different sensor inputs including at least one sensor input for connection to a perimeter sensor for detecting opening of an access to an area protected by said alarm device, said control means further comprising means for controlling said audible signal unit to produce an audible output signal on receipt of an arm signal when said perimeter sensor input indicates said access is open.

4. The device as claimed in claim 1, wherein said signal processing unit comprises means for generating a data packet of ASCII digital data based on stored information and information received from said alarm signal receiver means, said processing unit including means for controlling said transceiver means to transmit said data packet repeatedly at spaced intervals during an alarm condition.

5. The device as claimed in claim 1, wherein said processing unit includes means for generating a data start flag and data end flag at the start and end of said alarm signal.

6. The unit as claimed in claim 1, wherein said processing unit has no keypad input for control of alarm, arm or disarm functions.

7. An alarm system, comprising a plurality of sensors for detecting different types of emergencies within an enclosed site, each sensor having a sensor output dependent on the status of the sensor;

an alarm unit at said site linked to said sensors for detecting the sensor outputs and for producing and transmitting an alarm signal on detection of an emergency condition by any of said sensors;

a remote central monitoring station for receiving and processing alarm signals;

the alarm unit including signal processor means for detecting an alarm condition and determining the type of alarm detected, signal generating means responsive to said signal processor means for generating said alarm signal, said alarm signal comprising a digital data packet in computer-readable, ASCII format with RS-232 protocol, a first modem for receiving said digital data packet and converting the data packet to a wireless transmittable format, transceiver means for receiving and transmitting wireless signals via a wireless telephone network, said transceiver means being linked to said signal processor means and said modem, and a wireless telephone handset linked to said transceiver means;

said alarm unit further including control means for controlling said transceiver means to operate in a normal mode for normal wireless telephone communications via said handset when no emergency has been detected, and to operate in an alarm mode on detection of an emergency condition, said control means controlling said transceiver means in said alarm mode to establish a wireless link to said central monitoring station and to transmit said alarm signal to said central monitoring station after detection of an emergency;

said remote central monitoring station including a second, RS-232 compatible modem for directly receiving said transmitted alarm signal and converting said alarm signal directly to a computer-readable format, and a computer linked to said second modem for determining the type and location of the emergency based on said received alarm signal;

said control means further comprising means for controlling said transceiver means to transmit voice and said ASCII digital data packet simultaneously in real time over the same wireless link; and said remote monitoring station having a voice/data switch for receiving incoming voice and said ASCII digital data packet via said link and for separating voice from said ASCII digital data packet, the switch having a voice output for connection to telephone earphones and a data output directly connected to said second modem.

8. A wireless phone based alarm system, comprising:

a plurality of sensors for detecting different types of emergencies within an enclosed site;

an alarm unit at the site linked to the sensors for detecting initiation and type of emergency condition;

a remote monitoring station for linking with the alarm unit on initiation of an emergency condition;

the alarm unit comprising signal processing means for detecting an emergency condition and determining the type of alarm detected, signal generating means responsive to an emergency condition for generating an alarm signal comprising computer-readable, ASCII format digital data, a first RS-232 compatible modem linked to said signal generating means for converting said digital data to a wireless transmittable format, transceiver means for receiving and transmitting wireless signals via a wireless telephone network, said transceiver means being linked to said modem, and a wireless telephone handset linked to said transceiver means;

the alarm unit further comprising control means for controlling said transceiver means to operate in a normal mode for normal wireless telephone communications when no emergency condition has been detected, and to operate in an alarm mode on detection of an emergency condition, said control means controlling said transceiver means in said alarm mode to establish a link to said remote monitoring station and to transmit said alarm signal of computer-readable, ASCII digital data simultaneously in real time with audio signals from said handset via said same link to said remote monitoring station, whereby an operator at said remote monitoring station can listen to audio at said enclosed area while receiving said alarm signal on the same link at the same time; and said remote monitoring station including a voice/data switch for separating incoming audio and said digital data alarm signal into an audio output and an ASCII digital data output, telephone earphones connected to said audio output, a second RS-232 compatible modem linked to said ASCII digital data output for converting said received alarm signal into computer-readable format, and a computer linked to said second modem for receiving and interpreting said converted alarm signal.

9. A method of monitoring an enclosed area for emergency conditions and providing an alarm signal to a remote monitoring station in the event of detection of an emergency condition, comprising the steps of:

providing a plurality of sensors for detecting different types of emergency in the enclosed area;

connecting the sensor outputs to an alarm processing unit;

receiving the sensor outputs in the alarm processing unit and monitoring the outputs;

generating said alarm signal when at least one of the sensor outputs indicates the presence of an emergency condition, the generated alarm signal comprising an ASCII digital data packet of computer-readable data in RS-232 format;

using a first RS-232 compatible modem to convert the alarm signal to a wireless transmittable form;

controlling a transceiver to establish a wireless connection to the remote monitoring station;

transmitting the converted alarm signal via the wireless connection to the remote monitoring station;

connecting the transceiver in the alarm unit to a wireless telephone handset, operating the alarm processing unit in a normal mode when no emergency condition has been detected, whereby normal wireless telephone communications can be carried out using said handset, and operating the alarm processing unit in an alarm mode when an emergency condition has been detected to generate and transmit said alarm signal;

using a second RS-232 compatible modem at the remote monitoring station to receive the transmitted signal and convert it directly back to computer-readable, ASCII data in RS-232 format;

providing the reconverted data to a computer for analyzing the alarm signal and providing information on site and type of emergency to an operator at the monitoring station; and controlling said transceiver means in said alarm mode to transmit audio signals received by said telephone handset together with said ASCII digital data packet on the same wireless connection at the same time to said remote monitoring station, said received audio signals being transmitted real time together with said ASCII digital data packet, separating said audio signals from said ASCII digital data packet at said monitoring station, providing said audio signals to an earphone unit and providing said ASCII digital data packet directly to said second modem for conversion back to computer-readable format.

10. The method as claimed in claim 9, wherein the step of transmitting said alarm signal comprises generating a data packet of said computer-readable ASCII data with a start flag and an end flag and transmitting said packet at predetermined intervals, and the step of transmitting audio signals simultaneously comprises mixing audio signals with said data packets and transmitting both signals simultaneously, and muting said audio signals during transmission of each data packet of computer-readable ASCII data.

* * * * *